United States Patent
Chagari et al.

(10) Patent No.: US 12,494,203 B1
(45) Date of Patent: Dec. 9, 2025

(54) SYSTEMS AND METHODS TO RECOGNIZE PRONUNCIATION VARIATIONS OF INDIVIDUAL TERMS

(71) Applicant: Suki AI, Inc., Redwood City, CA (US)

(72) Inventors: Vamsi Reddy Chagari, Milpitas, CA (US); Gaurav Trivedi, Pittsburgh, PA (US); Priyank Raj, Los Altos, CA (US); Mona Abdul-Azeez Sheikh, Redwood City, CA (US); Raghu P. Chalasani, San Jose, CA (US); Ajithkumar Warrier, Fremont, CA (US); Jian Feng, Seattle, WA (US)

(73) Assignee: Suki AI, Inc., Redwood City, CA (US)

( * ) Notice: Subject to any disclaimer, the term of this patent is extended or adjusted under 35 U.S.C. 154(b) by 192 days.

(21) Appl. No.: 18/505,018

(22) Filed: Nov. 8, 2023

(51) Int. Cl.
*G10L 15/22* (2006.01)
*G10L 15/18* (2013.01)

(52) U.S. Cl.
CPC .............. *G10L 15/22* (2013.01); *G10L 15/18* (2013.01); *G10L 2015/223* (2013.01); *G10L 2015/225* (2013.01)

(58) Field of Classification Search
CPC ....... G10L 15/063; G10L 15/22; G10L 13/00; G10L 2015/223; G10L 2015/225; G10L 2015/226; G10L 15/005; G10L 15/02; G10L 15/05; G10L 2015/0638; G10L 2015/0636; G10L 2015/0633; G10L 15/18; G10L 17/22; G10L 25/30; G10L 15/183; G06F 40/40; G06F 40/242
See application file for complete search history.

(56) References Cited

U.S. PATENT DOCUMENTS

| | | | | |
|---|---|---|---|---|
| 8,204,739 | B2 * | 6/2012 | Waibel | G10L 13/00 704/7 |
| 8,972,268 | B2 * | 3/2015 | Waibel | G10L 15/06 704/277 |
| 11,222,185 | B2 * | 1/2022 | Waibel | G10L 13/00 |
| 11,222,620 | B2 * | 1/2022 | Chen | G10L 13/08 |
| 11,922,963 | B2 * | 3/2024 | Wang | G10L 25/30 |
| 11,972,227 | B2 * | 4/2024 | Waibel | G10L 15/26 |
| 2009/0281789 | A1 * | 11/2009 | Waibel | G06F 40/40 704/260 |

(Continued)

*Primary Examiner* — Vijay B Chawan
(74) *Attorney, Agent, or Firm* — Esplin & Associates, PC

(57) ABSTRACT

Systems and methods to recognize pronunciation variations of individual terms are disclosed. Exemplary implementations may: effectuate presentation of a diction interface; obtain audio information that represents sounds captured by the client computing platform; perform speech recognition on the audio information to generate a first term spelling and first term recognition spellings; determine a first ground truth spelling of the first term; upon determination that a first user-specific lexicon does not include the first ground truth spelling, add the first ground truth spelling to first user-specific lexicon; upon the first term recognition spellings matching the first ground truth spelling, correlate the utterance of the first term and the first ground truth spellings; upon the first term recognition spellings not matching the first ground truth spelling, correlate the first term recognition spellings and the first ground truth spelling, and correlate the first ground truth spelling and the utterance of the first term.

14 Claims, 3 Drawing Sheets

(56) References Cited

U.S. PATENT DOCUMENTS

| | | | | |
|---|---|---|---|---|
| 2011/0307241 | A1* | 12/2011 | Waibel | G06F 40/44 |
| | | | | 704/2 |
| 2018/0011842 | A1* | 1/2018 | Waibel | G10L 13/00 |
| 2020/0111484 | A1* | 4/2020 | Aleksic | G10L 15/22 |
| 2022/0238101 | A1* | 7/2022 | Sainath | G06N 3/045 |
| 2022/0383862 | A1* | 12/2022 | Aleksic | G10L 15/22 |
| 2023/0395069 | A1* | 12/2023 | Moreno | G10L 15/02 |
| 2024/0013777 | A1* | 1/2024 | Lu | G10L 15/16 |
| 2024/0021190 | A1* | 1/2024 | Biadsy | G10L 15/063 |
| 2024/0274123 | A1* | 8/2024 | Zhang | G10L 15/02 |
| 2024/0304178 | A1* | 9/2024 | Rosenberg | G06F 21/6254 |

* cited by examiner

SYSTEMS AND METHODS TO RECOGNIZE PRONUNCIATION VARIATIONS OF INDIVIDUAL TERMS

FIELD OF THE DISCLOSURE

The present disclosure relates to systems and methods to recognize pronunciation variations of individual terms.

BACKGROUND

Individual users may pronounce the same term differently than other users due to their accents, regional dialects, varying inflections, and/or varying enunciations. Based on various utterances of the term that reflect different pronunciations, systems that employ speech recognition may misunderstand the term and incorrectly transcribe the term, or may not be able to recognize the utterance of the term.

SUMMARY

One aspect of the present disclosure relates to a system configured to recognize pronunciation variations of individual terms. The system may obtain utterances by a user that spells a term, receive manual input of the letters to spell the term, and obtain utterances of the term by the user that reflect how the user pronounces the term. A ground truth spelling of the term may be determined and stored in a user-specific lexicon for the user. The ground truth spelling may be a verified correct spelling of the term. The utterances that reflect the pronunciations and automatic speech recognition output based on the utterances may be correlated with the ground truth spelling stored in the user-specific lexicon. Thus, upon the user uttering the term in their own intonation, accent, and enunciation, the correct spelling of the term may be determined, transcribed, and presented in a note during various dictations. Furthermore, such system may provide an improvement to existing speech recognition systems that may fail to recognize utterances that vary given varying intonations, accents, and enunciations by users, and ultimately improve processing time by computers that employ the existing speech recognition systems and accuracy.

The system may include electronic storage, one or more hardware processors configured by machine-readable instructions, and/or other components. The machine-readable instructions may include one or more instruction components. The instruction components may include computer program components. The instruction components may include one or more of a presentation effectuation component, an audio component, a speech recognition performance component, a ground truth determining component, a correlation component, and/or other instruction components.

The electronic storage may store user-specific lexicons including a first user-specific lexicon specific to a first user. The user-specific lexicons may include at least ground truth spellings for terms, and correlations between utterances of the terms by the specific users that reflect their pronunciations of the terms, the ground truth spellings of the terms, term recognition spellings of the terms, and/or other information.

The presentation effectuation component may be configured to effectuate, via a client computing platform associated with the first user, presentation of a diction interface that prompts the first user to produce utterances of letters to spell a first term, and prompts the first user to produce utterances of the first term.

The audio component may be configured to obtain audio information that represents sounds captured by the client computing platform. The audio information may include at least first audio information, second audio information, and/or other audio information. The sounds represented by the first audio information may convey the utterances of the letters that spell the first term. The sounds represented by the second audio information may convey the utterances of the first term which may reflect a pronunciation of the first term by the first user.

The speech recognition component may be configured to perform speech recognition on the first audio information to generate a first term spelling made up of the letters included in the utterances of the first user conveyed by the first audio information that spell the first term. The speech recognition component may be configured to generate first term recognition spellings. The first term recognition spellings may be generated automatically by performing speech recognition on the second audio information.

The ground truth determining component may be configured to determine a first ground truth spelling of the first term. The first ground truth spelling may be determined by at least concatenating the first term spelling. The ground truth determining component may be configured to determine whether the first user-specific lexicon includes the first ground truth spelling of the first term. The ground truth determining component may be configured to, upon determination that the first user-specific lexicon does not include the first ground truth spelling, add the first ground truth spelling to the first user-specific lexicon.

The correlation component may be configured to determine whether individual ones of the first term recognition spellings match the first ground truth spelling included in the first user-specific lexicon. The correlation component may be configured to, upon the individual first term recognition spellings matching the first ground truth spelling, correlate the second audio information that conveys the utterance of the first term and the first ground truth spelling. The correlation component may be configured to, upon the individual first term recognition spellings not matching the first ground truth spelling, correlate the individual first term recognition spellings and the first ground truth spelling, and correlate the first ground truth spelling and the second audio information that conveys the utterance of the first term.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
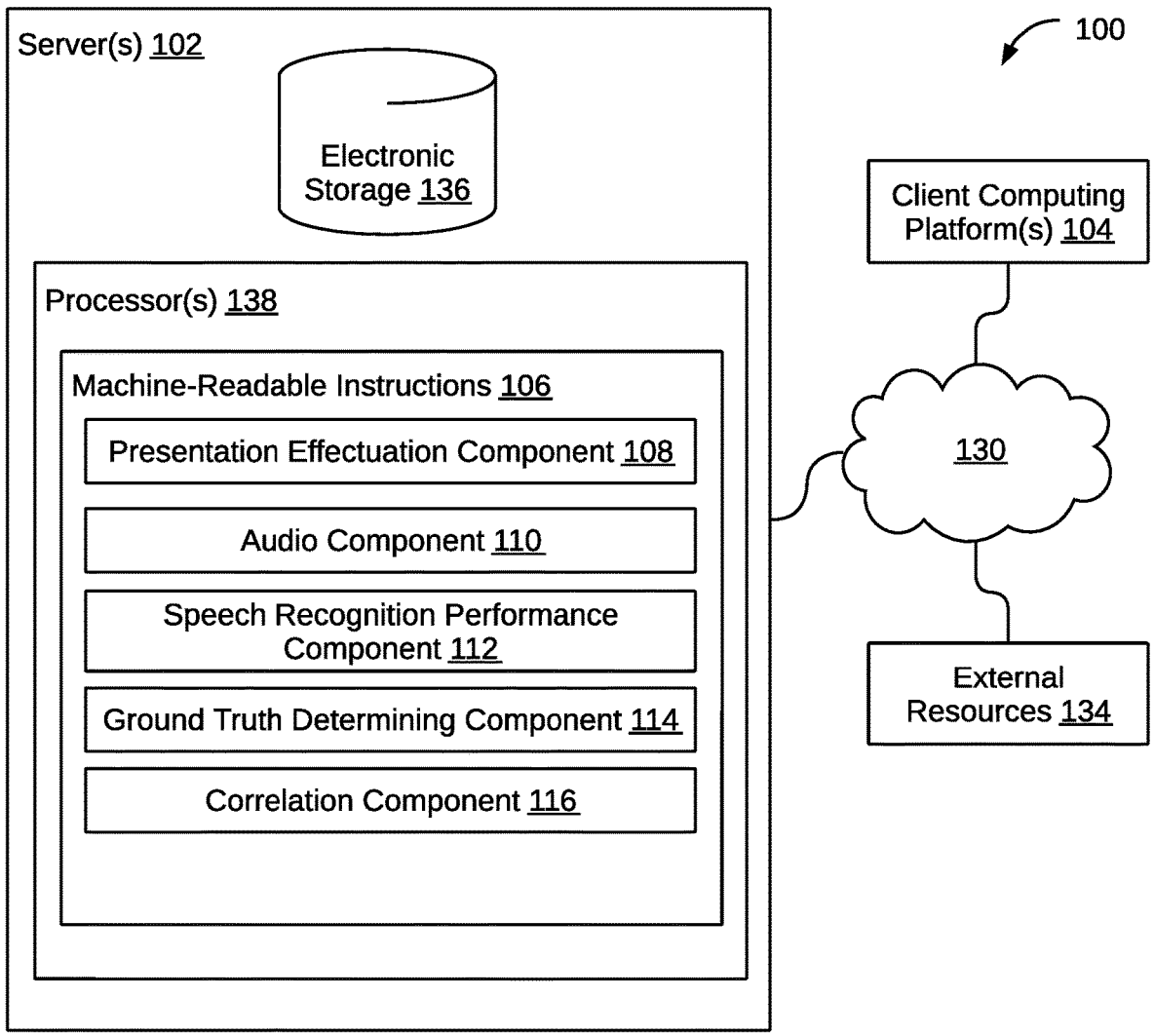
FIG. 1 illustrates a system configured to recognize pronunciation variations of individual terms, in accordance with one or more implementations.

FIG. 1 illustrates a system 100 configured to recognize pronunciation variations of individual terms, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include electronic storage 136 and/or other components, and may be configured by machine-readable instructions 106. Electronic storage 136 may store user-specific lexicons, audio information, ground truth spellings of terms, term recognition spellings of the terms, correlations, and/or other information. A user-specific lexicon may be a set of terms frequently used by a given user, particular to the given user, and/or related to one or more topics frequently discussed by the given user. By way of non-limiting example, the user-specific lexicons may include a first user-specific lexicon specific to a first user. A term may be a word or phrase that may be expressed verbally, textually, and/or expressed in other manners. Individual ones of the user-specific lexicons may include at least the ground truth spellings of the terms. A ground truth spelling for a given term may be a verified spelling and textual representation of the given term. The ground truth spelling for the given term may be what is intended to be populated in notes. The ground truth spellings may be verified by the users via client computing platform 104.

The audio information may represent sounds captured by client computing platform 104. Different ones of the sounds may convey utterances by the users. Some of the utterances may be spellings of the terms. Some of the utterances may reflect pronunciations of the terms. The utterances that spell the terms may convey each letter that comprises the terms. The utterances that convey the pronunciations may capture how the user particularly articulates the terms as different ones of the users may have different accents, different inflections, and/or enunciate differently. In some implementations, utterances that convey alternative references to the terms may be provided. The alternative references may be utterances, that are different from pronunciations of the term, that refer to the terms. That is, for example, utterance of an alternative name (e.g., OB) may refer to a particular term (e.g., obstetrics). The term recognition spellings may be textual representations of the terms that are automatically generated upon performance of speech recognition techniques without user intervention. The speech recognition techniques may be novel and/or known.

The correlations may establish relationships between different pieces of information. The correlations may be between at least the second audio information that convey utterances of the terms (and thus, the utterances of the terms that vary per user) that reflect pronunciations of the terms or the alternative references to the terms, the ground truth spellings of the terms, term recognition spellings of the terms, and/or other information. In some implementations, the individual ground truth spellings may be included in a maximum of five or other amount of correlations. Meaning, the given term may be correlated with a maximum of five different utterances that reflect various pronunciations by a specific user and alternative references, and five different term recognition spellings automatically generated by performances of speech recognition.

Machine-readable instructions 106 may include one or more instruction components. The instruction components may include computer program components. The instruction components may include one or more of presentation effectuation component 108, audio component 110, speech recognition performance component 112, ground truth determining component 114, correlation component 116, and/or other instruction components.

Presentation effectuation component 108 may be configured to effectuate, via client computing platforms 104 associated with the users, presentation of a diction interface. The dictation interface may prompt the individual users to produce utterances of (alphabet) letters to spell the individual terms, provide manual input of the letters to spell the individual terms, and prompt the individual users to produce utterances of the individual terms. Use of the term "letters" herein may refer to alphabet letters. It is appreciated that system 100 is described in reference to the English alphabet and the English language, but this is not intended to be limiting as other alphabets (e.g., accented alphabetic letters) may be contemplated and other languages may be contemplated.

The dictation interface may include user interface elements. The user interface elements may be configured to facilitate user interaction with the dictation interface, user entry, and/or selection. An individual user interface element may be configured to be selected or manipulated by the users to provide one or more selections, initiate capturing the sounds, terminate capturing of the sounds, suspending capturing of the sounds, among other user input. By way of non-limiting illustration, the user interface elements may include one or more of buttons (e.g., keyboard, mouse), switches, a trackpad, a touchscreen, text input fields, virtual drop down menus, virtual check boxes, virtual display windows, virtual buttons, and/or other user interface elements. Voice commands may be captured by client computing platform 104. The voice commands may convey the same user interface user entry and/or selection with an utterance by the user.

By way of non-limiting example, the dictation interface may prompt a first user associated with client computing platform 104 to produce utterances of letters to spell a first term, provide manual input of the letters to spell the first term, and prompt the first user to produce at least one utterance of the first term. In some implementations, the dictation interface may prompt the first user to produce multiple the utterances that convey the letters to spell to the first term. A minimum and maximum amount of utterances that convey the letters to spell to the individual terms may be fixed or modifiable by the users (e.g., an administrative user). In some implementations, the dictation interface may prompt the first user to produce multiple the utterances of the first term. A minimum and maximum amount of utterances of the individual terms that reflect the pronunciation or the alternative references may be fixed or modifiable by the users (e.g., the administrative user).

Audio component 110 may be configured to obtain the audio information that represents the sounds captured by client computing platform 104. In some implementations, the audio information may include digital audio signals that encode sounds of individual utterances of the users, a recording of the individual utterances of the users, and/or other audio information. In some implementations, the sounds of the utterances of the user may be detected by an audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, audio component 110 may be configured to generate the audio information based on the sounds in response to silence that follows utterances and/or user input via the user interface elements (e.g., selecting a virtual button). In some implementations, the silence may be for a particular amount of time that may be fixed or modifiable by the users.

The audio information may include preliminary audio information, first audio information, second audio information, and/or other audio information. The preliminary audio information may represent preliminary sounds captured by client computing platforms 104. The preliminary sounds may convey a particular command. The particular command may be stored in electronic storage 136. The particular command may be a particular phrase that causes the presentation of the diction interface responsive to utterance of the particular command by the individual users. Thus, in some implementations, audio component 110 may be configured to cause the dictation interface to prompt the users to utter the letters that spell the terms responsive to determining the utterance of the particular command. In some implementations, prompting the user to utter the letters that spell the terms may include presenting a text and/or playing an audio clip (e.g., "Please spell a term"). In some implementations, prompting the users to utter the letters that spell the terms may include presenting one or more of the user interface elements that indicate to begin capture of the sounds, indicate to end capture of the sounds, indicate an end of an utterance and beginning of a subsequent utterance, and/or other indications.

The sounds represented by the first audio information may convey the utterances of the letters that spell the terms. That is, by way of non-limiting example, the first audio information may convey the utterances of the letters that spell the first term. In some implementations, the capture of the sounds may begin subsequent to the presentation of the prompt to utter the letters, and end upon the silence that follows the utterances of the letters. In some implementations, user input may be received via the user interface elements and/or the voice commands before and/or subsequent to the utterances to signify a beginning and an end of the utterances of the letters. By way of non-limiting example, the first user may select a first virtual button indicating to begin the capture of the sounds (that will convey the utterances of the letters that spell the first term). Subsequent to the utterances, the first user may select the first virtual button to end such capture.

The sounds represented by the second audio information may convey the utterances of the individual terms which may reflect pronunciations of the individual terms by the users and/or the alternative references. By way of non-limiting example, the second audio information may convey at least one utterance of the first term which reflect pronunciations of the first term by the first user. In some implementations, prompting the users to utter the terms may include presenting a second text and/or playing a second audio clip (e.g., "Please say the term"). In some implementations, the second audio information may convey a maximum of five utterances of the first term or other amount defined by the users.

In some implementations, the capture of these sounds may begin subsequent to the presentation of the prompt to utter the first term, the utterances of the first term may be uttered sequentially, and such capture may end upon the silence that follows. In some implementations, user input may be received before and/or subsequent to each utterance of the first term to signify a beginning and an end to each utterance. For example, the first user may select the first virtual button indicating to begin the capture of the sounds (that will convey the utterances of the first term). The first user may subsequently utter a first utterance of the first term and select a second virtual button that indicates the end of the first utterance and a beginning of a subsequent utterance. The first user may utter a second utterance of the first term, select the second virtual button, utter a third utterance of the first term, select the second virtual button, and utter a fourth utterance of the first term. Subsequently, the first user may select the first virtual button indicating to end the capture of the sounds represented by the second audio information.

In some implementations, audio component 110 may be configured to determine whether the audio information is recognizable. Determining whether the audio information is recognizable may include analysis of the digital audio signals, analysis of the analog waves, determining if background noise is present, determining significance of the background noise, and/or other analysis. Audio component 110 may be configured to, upon determining that the audio information is unrecognizable, cause the dictation interface to present an error message and subsequently prompt the first user to provide supplementary audio information. The error message may convey that the audio information was unrecognizable and re-present the prompt to the users.

In some implementations, some or all of the functions of audio component 110 may be performed by client computing platform 104 locally. For example, client computing platform 104 may be configured to receive the user input that indicates to begin capture of the sounds, generate the audio information, and subsequently transmit the audio information to server(s) 102. In some implementations, audio component 110 may be configured to receive, via the dictation interface, the manual input of the letters that spell the individual terms, e.g., the first term.

Speech recognition performance component 112 may be configured to perform speech recognition on the audio information. In some implementations, the speech recognition may be performed responsive to determination that the audio information is recognizable. The speech recognition may be performed on the first audio information to generate the term spellings that make up of the letters included in the utterances by the users that spell the individual terms. In some implementations, the speech recognition may be performed by external resources 134, and subsequently output (e.g., the term recognition spellings) may be obtained from external resources 134 via a network 130.

By way of non-limiting example, the speech recognition may be performed on the first audio information to generate a first term spelling made up of the letters included in the utterances by the first user that spell the first term. A term spelling (e.g., the first term spelling) may include textual representations of the letters that the users uttered to spell the terms. For example, the first term spelling may include the textual representations of the letters that the first user uttered to spell the first term. In some implementations, the individual term spellings may be generated into a data structure, such as an array, that separates each letter while grouping the letters that spell the individual terms.

In some implementations, presentation effectuation component 108 may be configured to effectuate presentation of the term spellings to the users, such as the first term spelling to the first user, via the dictation interface. The presentation of the first term spelling, for example, may request user input that indicates whether the first term spelling based on the first audio information is correct or incorrect. The user input that indicates that the term spellings are correct or incorrect may be obtained via the user interface elements and the voice commands. In some implementations, the dictation interface may prompt the first user to utter the first term, to obtain the second audio information, responsive to the indication that the first term spelling is correct and a first ground truth spelling is generated as described herein. In some implementations, presentation effectuation component 108 may be configured to cause, responsive to the user input indicating the first term spelling is incorrect, the dictation interface to prompt the user to re-utter the letters that spell the first term.

Furthermore, the speech recognition may be performed on the second audio information to generate sets of the term recognition spellings for the individual terms. The term recognition spellings may be automatically generated by performing the speech recognition on the second audio information. A term recognition spelling may be generated for each utterance of the individual terms. For example, a set of first term recognition spellings may be generated for the first term. The set of the first term recognition spellings may include a (first) first term recognition spelling for the first utterance of the first term, a (second) first term recognition spelling for the second utterance of the first term, a (third) first term recognition spelling for the third utterance of the first term, and a (fourth) first term recognition spelling for the fourth utterance of the first term.

Ground truth determining component 114 may be configured to determine the individual ground truth spellings of the terms. The individual ground truth spellings may be determined by concatenating the term spellings generated and/or by other determinations. In some implementations, ground truth determining component 114 may cause the presentation effectuation component 108 to present the term spellings via the dictation interface and request the user input indicating whether the term spellings are correct or incorrect. Thus, the individual ground truth spellings of the individual terms may be generated responsive to the indication that the individual term spellings are correct. By way of non-limiting example, the first ground truth spelling of the first term may be generated responsive to the indication by the user input that the first term spelling is correct. Meaning, the user input may indicate that the first term spelling for the first term is correct. In response, the first term spelling may be concatenated to determine the first ground truth spelling of the first term.

Ground truth determining component 114 may be configured to determine whether the user-specific lexicons for the respective users include the ground truth spellings of the terms. The determination may include searching the relevant user-specific lexicons based on the ground truth spellings to determine presence. By way of non-limiting example, ground truth determining component 114 may determine whether the first user-specific lexicon includes the first ground truth spelling of the first term.

Upon determination that the relevant user-specific lexicons do not include the ground truth spellings, ground truth determining component 114 may be configured to add the ground truth spellings to the relevant user-specific lexicons. By way of non-limiting example, upon determination that the first user-specific lexicon does not include the first ground truth spelling, ground truth determining component 114 may be configured to add the first ground truth spelling to the first user-specific lexicon.

For each of the term recognition spellings that represent the utterances of the individual terms, correlation component 116 may be configured to determine whether the individual term recognition spellings match the individual ground truth spellings included in the user-specific lexicons. Determining whether the individual term recognition spellings match the individual ground truth spellings may include comparing each of the letters that make up the individual ground truth spellings with (automatically generated by the speech recognition) letters that make up the individual term recognition spellings to determine indistinguishability. In some implementations, the comparison of the (automatically generated by the speech recognition) letters that make up the individual term recognition spellings may be with the data structure counterparts that include separate elements for each of the letters that comprise the terms.

Upon the individual term recognition spellings matching the individual ground truth spellings, correlation component 116 may be configured to correlate the second audio information that conveys the utterance of the respective terms and/or the alternative references, and the individual ground truth spellings. Correlating may refer to establishing a connection or association between pieces of information such that upon utterance of the individual terms, the correlated ground truth spellings are determined from the user-specific lexicons in electronic storage 136.

Upon the individual term recognition spellings not matching the individual respective ground truth spellings, correlation component 116 may be configured to correlate the individual term recognition spellings to the individual ground truth spellings and correlate the individual ground truth spellings to the second audio information that conveys the utterance of the individual terms and/or the alternative references. In some implementations, the ground truth spellings may already be included in the relevant user-specific lexicons but not correlated with user-specific utterances that reflect their own pronunciation of the terms and/or their own alternative references. In such implementations, correlation component 116 may be configured to establish the same correlations described herein with the existing ground truth spellings.

By way of non-limiting example, for each of the first term recognition spellings that represent the utterances of the first term, correlation component 116 may be configured to determine whether the first term recognition spelling matches the first ground truth spelling included in the first user-specific lexicon. Upon the first term recognition spelling (e.g., the (first) first term recognition spelling based on the first utterance of the first term) matching the first ground truth spelling, the second audio information conveying the utterance counterpart (e.g., the first utterance of the first term) of the first term may be correlated with the first ground truth spelling in the first user-specific lexicon. Upon the first term recognition spelling not matching the first ground truth spelling, the first term recognition spelling may be correlated with the first ground truth spelling, and the first ground truth spelling may be correlated with the second audio information conveying the utterance of the first term. Such correlations may be stored in electronic storage 136. As such, varying utterances of the first term are correlated with the first ground truth spelling that may be populated in notes, and the varying utterances of the first term are correlated with the various first term recognition spellings automatically generated by the performance of the speech recognition.

Figure 3A:
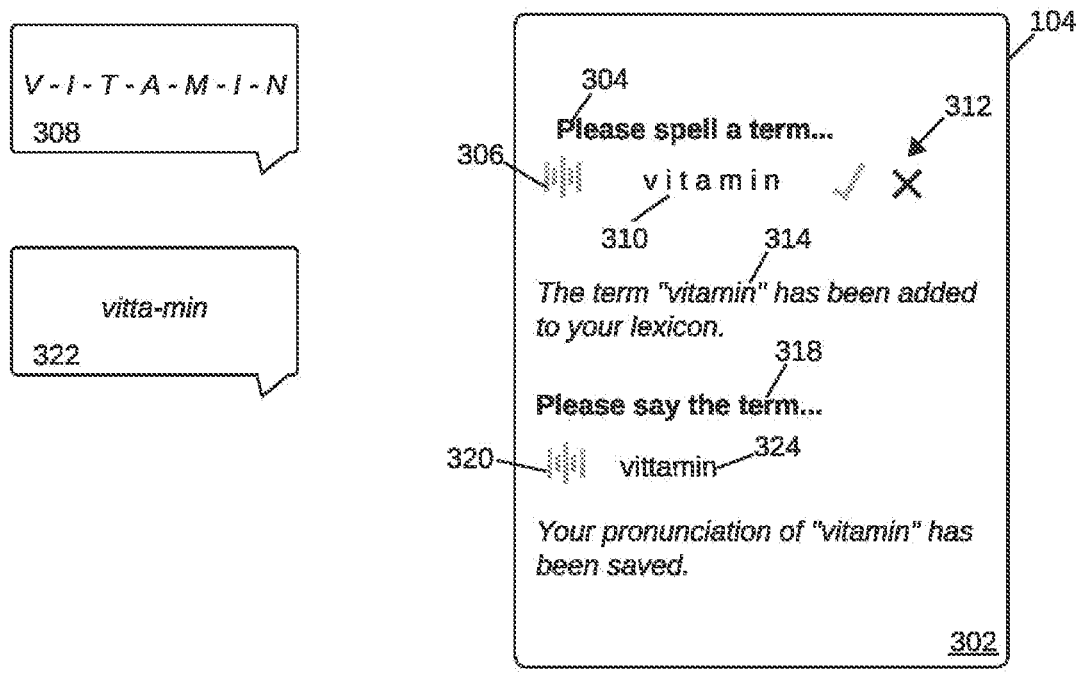
FIG. 3A-C illustrates an example implementation of a dictation interface and electronic storage provided by the system configured to recognize pronunciation variations of individual terms, in accordance with one or more implementations.

FIG. 3A illustrates client computing platform 104 that presents a dictation interface 302. Dictation interface 302 may prompt 304 a user (not illustrated) to spell a term. Audio information 306 may be obtained that conveys utterance 308 of the user spelling the term. Utterance 308 may be translated into a term spelling 310. The user may approve or reject term spelling 310 by selecting one of user interface elements 312. Upon approval of term spelling 310, term spelling 310 may be concatenated to generate a ground truth spelling 314.

Figure 3B:
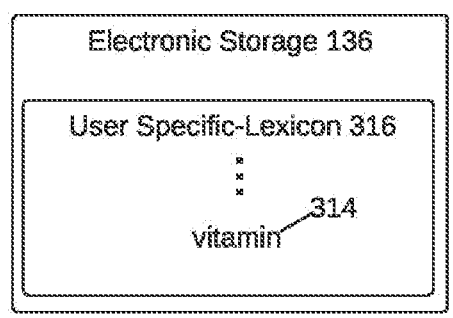

Referring to FIG. 3B, upon determination that a user specific-lexicon 316 in electronic storage 136 (the same as in FIG. 1) does not include ground truth spelling 314, ground truth spelling 314 may be added to user specific-lexicon 316.

Figure 3C:
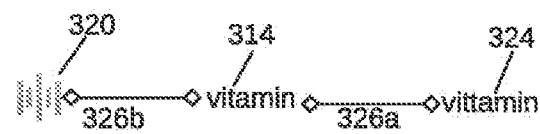

Referring back to FIG. 3A, dictation interface 302 may prompt 318 the user to say the term. Audio information 320 may be obtained that conveys utterance 322 of the user saying the term. Utterance 322 may be translated into term recognition spelling 324. Upon determination that term recognition spelling 324 does not match ground truth spelling 314 in user specific-lexicon 316 in FIG. 3B, referring to FIG. 3C, ground truth spelling 314 may be correlated (326a) with term recognition spelling 324, and ground truth spelling 314 may be correlated (326b) with audio information 320 that conveys utterance 322. Correlations 326a and 326b may be stored in electronic storage 136 of FIG. 3B.

Referring back to FIG. 1, in some implementations, server(s) 102, client computing platform(s) 104, and/or external resources 134 may be operatively linked via one or more electronic communication links. For example, such electronic communication links may be established, at least in part, via network 130 such as the Internet and/or other networks. It will be appreciated that this is not intended to be limiting, and that the scope of this disclosure includes implementations in which server(s) 102, client computing platform(s) 104, and/or external resources 134 may be operatively linked via some other communication media.

A given client computing platform 104 may include one or more processors configured to execute computer program components. The computer program components may be configured to enable an expert or user associated with the given client computing platform 104 to interface with system 100 and/or external resources 134, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 134 may include sources of information outside of system 100, external entities participating with system 100, and/or other resources. In some implementations, some or all of the functionality attributed herein to external resources 134 may be provided by resources included in system 100.

Server(s) 102 may include electronic storage 136, one or more processors 138, and/or other components. Server(s) 102 may include communication lines, or ports to enable the exchange of information with network 130 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 136 may comprise non-transitory storage media that electronically stores information. The electronic storage media of electronic storage 136 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 may include one or more virtual storage resources (e.g., cloud storage, a virtual private network, and/or other virtual storage resources). Electronic storage 136 may store software algorithms, information determined by processor(s) 138, information received from server(s) 102, information received from client computing platform(s) 104, and/or other information that enables server(s) 102 to function as described herein.

Processor(s) 138 may be configured to provide information processing capabilities in server(s) 102. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some implementations, processor(s) 138 may include a plurality of processing units. These processing units may be physically located within the same device, or processor(s) 138 may represent processing functionality of a plurality of devices operating in coordination. Processor(s) 138 may be configured to execute components 108, 110, 112, 114, and/or 116, and/or other components. Processor(s) 138 may be configured to execute components 108, 110, 112, 114, and/or 116, and/or other components by software; hardware; firmware; some combination of software, hardware, and/or firmware; and/or other mechanisms for configuring processing capabilities on processor(s) 138. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 138 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 138 may be configured to execute one or more additional components that may perform some or all of the functionality attributed below to one of components 108, 110, 112, 114, and/or 116.

Figure 2:
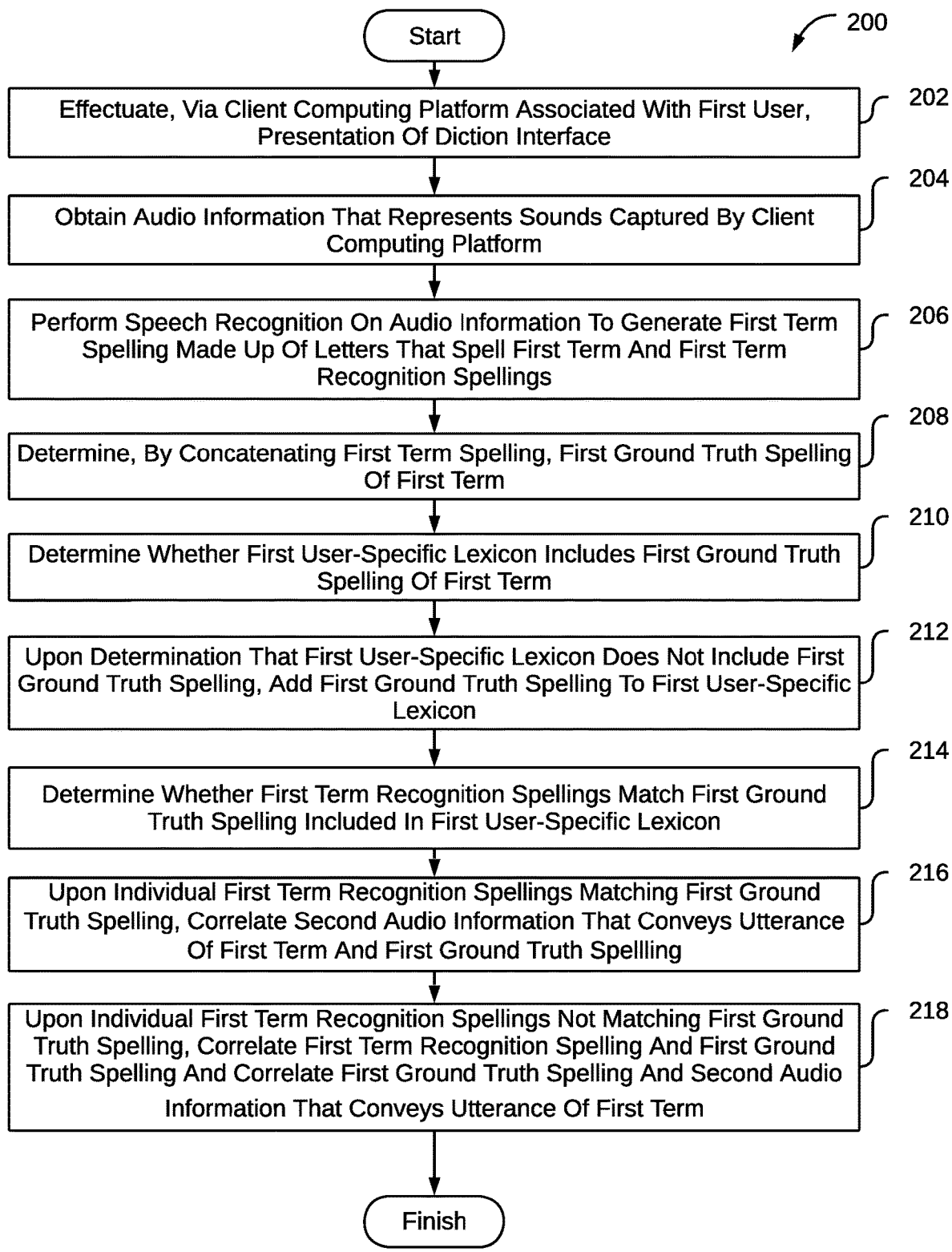
FIG. 2 illustrates a method to recognize pronunciation variations of individual terms, in accordance with one or more implementations.

FIG. 2 illustrates a method 200 to recognize pronunciation variations of individual terms, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include effectuating, via a client computing platform associated with the first user, presentation of a diction interface that prompts the first user to produce utterances of letters to spell a first term, and prompts the first user to produce utterances of the first term. Operation 202 may be performed by one or more hardware processors configured by machine-readable instructions including a component that is the same as or similar to presentation effectuation component 108, in accordance with one or more implementations.

An operation 204 may include obtaining audio information that represents sounds captured by the client computing platform. The audio information may include first audio information and second audio information. The sounds represented by the first audio information convey the utterances of the letters that spell the first term. The sounds represented by the second audio information convey the utterances of the first term which may reflect a pronunciation of the first term by the first user. Operation 204 may be performed by one or more hardware processors configured by machine-readable instructions including a component that is the same as or similar to audio component 110, in accordance with one or more implementations.

An operation 206 may include performing speech recognition on the audio information to generate a first term spelling made up of the letters included in the utterances of the first user conveyed by the first audio information that spell the first term, and first term recognition spellings automatically generated by the speech recognition. Operation 206 may be performed by one or more hardware processors configured by machine-readable instructions including a component that is the same as or similar to speech recognition performance component 112, in accordance with one or more implementations.

An operation 208 may include determining a first ground truth spelling of the first term. The first ground truth spelling may be determined by concatenating the first term spelling. Operation 208 may be performed by one or more hardware processors configured by machine-readable instructions including a component that is the same as or similar to ground truth determining component 114, in accordance with one or more implementations.

An operation 210 may include determining whether the first user-specific lexicon includes the first ground truth spelling of the first term. Operation 210 may be performed by one or more hardware processors configured by machine-readable instructions including a component that is the same as or similar ground truth determining component 114, in accordance with one or more implementations.

An operation 212 may include, upon determination that the first user-specific lexicon does not include the first ground truth spelling, adding the first ground truth spelling to the first user-specific lexicon. Operation 212 may be performed by one or more hardware processors configured by machine-readable instructions including a component that is the same as or similar to ground truth determining component 114, in accordance with one or more implementations.

An operation 214 may include determining whether the first term recognition spellings match the first ground truth spelling included in the first user-specific lexicon. Operation 214 may be performed by one or more hardware processors configured by machine-readable instructions including a component that is the same as or similar to correlation component 116, in accordance with one or more implementations.

An operation 216 may include upon the individual first term recognition spellings matching the first ground truth spelling, correlating the second audio information that conveys the utterance of the first term and the first ground truth spelling. Operation 216 may be performed by one or more hardware processors configured by machine-readable instructions including a component that is the same as or similar to correlation component 116, in accordance with one or more implementations.

An operation 218 may include upon the individual first term recognition spellings not matching the first ground truth spelling, correlating the first term recognition spellings and the first ground truth spelling, and correlating the first ground truth spelling and second audio information that conveys the utterance of the first term. Operation 218 may be performed by one or more hardware processors configured by machine-readable instructions including a component that is the same as or similar to correlation component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to recognize pronunciation variations of individual terms, the system comprising:
electronic storage that stores:
(a) user-specific lexicons including a first user-specific lexicon specific to a first user, wherein the user-specific lexicons include ground truth spellings for terms, and
(b) correlations between:
(i) utterances of the terms that reflect pronunciations of the terms,
(ii) the ground truth spellings of the terms, and
(iii) term recognition spellings of the terms; and
one or more processors configured by machine-readable instructions to:
effectuate, via a client computing platform associated with the first user, presentation of a diction interface that prompts the first user to produce first utterances of letters to spell a first term, and prompts the first user to produce second utterances of the first term;
obtain audio information that represents sounds captured by the client computing platform, wherein the audio information includes first audio information and second audio information, wherein the sounds represented by the first audio information convey the first utterances of the letters that spell the first term, and wherein the sounds represented by the second audio information convey the second utterances of the first term which reflect a pronunciation of the first term by the first user;
perform speech recognition on the audio information to generate:
a first term spelling made up of the letters included in the first utterances of the first user conveyed by the first audio information that spell the first term, and
first term recognition spellings, wherein first term recognition spellings are generated automatically by performance of speech recognition on the second audio information;
determine a first ground truth spelling of the first term, wherein the first ground truth spelling is determined by concatenating the first term spelling;
determine whether the first user-specific lexicon includes the first ground truth spelling of the first term;
upon determination that the first user-specific lexicon does not include the first ground truth spelling, add the first ground truth spelling to the first user-specific lexicon; and
for individual ones of the first term recognition spellings that represent the second utterances of the first term:
determine whether the individual ones of the first term recognition spelling match the first ground truth spelling included in the first user-specific lexicon;
upon determining the individual ones of the first term recognition spellings match the first ground truth spelling, correlate the second audio information that conveys the second utterances of the first term and the first ground truth spelling; and
upon determining the individual ones of the first term recognition spellings do not match the first ground truth spelling, correlate the individual ones of the first term recognition spellings and the first ground truth spelling, and correlate the first ground truth spelling and the second audio information that conveys the second utterances of the first term.

2. The system of claim 1, wherein the one or more processors are further configured by the machine-readable instructions to:
obtain preliminary audio information that represents preliminary sounds captured from the client computing platform, wherein the preliminary sounds convey a particular command, wherein the particular command causes the presentation of the diction interface.

3. The system of claim 2, wherein the one or more processors are further configured by the machine-readable instructions to:
effectuate presentation of the first term spelling to the first user via the diction interface;
receive, via the diction interface, user input indicating whether the first term spelling is correct, wherein the first ground truth spelling of the first term is generated responsive to indication that the first term spelling is correct; and
cause, responsive to the user input indicating the first term spelling is incorrect, the diction interface to prompt the first user to re-utter the letters that spell the first term.

4. The system of claim 3, wherein the diction interface is configured to:
prompt the first user to utter the letters that spell the first term responsive to the particular command, and
prompt the first user to utter the first term responsive to the indication that the first term spelling is correct.

5. The system of claim 1, wherein the second audio information conveys a maximum of five utterances of the first term.

6. The system of claim 1, wherein the one or more processors are further configured by the machine-readable instructions to:
determine whether the audio information is recognizable; and
upon determination that the audio information is unrecognizable, cause the diction interface to present an error message and subsequently prompt the first user to provide supplementary audio information, wherein the speech recognition is performed responsive to determination that the audio information is recognizable.

7. The system of claim 1, wherein first ground truth spelling is included in a maximum of five of the correlations.

8. A method to recognize pronunciation variations of individual terms, the method comprising:
effectuating, via a client computing platform associated with a first user, presentation of a diction interface that prompts the first user to produce first utterances of letters to spell a first term, and prompts the first user to produce second utterances of the first term, wherein electronic storage that stores (a) user-specific lexicons including a first user-specific lexicon specific to the first user, wherein the user-specific lexicons include ground truth spellings for terms, and (b) correlations between (i) utterances of the terms that reflect pronunciations of the terms, (ii) the ground truth spellings of the terms, and (iii) term recognition spellings of the terms;
obtaining audio information that represents sounds captured by the client computing platform, wherein the audio information includes first audio information and second audio information, wherein the sounds represented by the first audio information convey the first utterances of the letters that spell the first term, and wherein the sounds represented by the second audio information convey the second utterances of the first term which reflect a pronunciation of the first term by the first user;

performing speech recognition on the audio information to generate:
- a first term spelling made up of the letters included in the first utterances of the first user conveyed by the first audio information that spell the first term, and
- first term recognition spellings, wherein the first term recognition spellings are automatically generated by performing the speech recognition on the second audio information;

determining a first ground truth spelling of the first term, wherein the first ground truth spelling is determined by concatenating the first term spelling;

determining whether the first user-specific lexicon includes the first ground truth spelling of the first term;

upon determination that the first user-specific lexicon does not include the first ground truth spelling, adding the first ground truth spelling to the first user-specific lexicon;

determining whether individual ones of the first term recognition spellings match the first ground truth spelling included in the first user-specific lexicon;

upon determining the individual ones of the first term recognition spellings match the first ground truth spelling, correlating the second audio information that conveys the second utterances of the first term and the first ground truth spelling; and upon determining the individual ones of the first term recognition spellings do not match the first ground truth spelling, correlating the individual ones of the first term recognition spellings and the first ground truth spelling, and correlating the first ground truth spelling and the second audio information that conveys the second utterances of the first term.

9. The method of claim 8, further comprising:
obtaining preliminary audio information that represents preliminary sounds captured from the client computing platform, wherein the preliminary sounds convey a particular command, wherein the particular command causes the presentation of the diction interface.

10. The method of claim 9, further comprising:
effectuating presentation of the first term spelling to the first user via the diction interface;
receiving, via the diction interface, user input indicating whether the first term spelling is correct, wherein the first ground truth spelling of the first term is generated responsive to indication that the first term spelling is correct; and
causing, responsive to the user input indicating the first term spelling is incorrect, the diction interface to prompt the first user to re-utter the letters that spell the first term.

11. The method of claim 10, wherein the diction interface is configured to:
prompt the first user to utter the letters that spell the first term responsive to the particular command, and
prompt the first user to utter the first term responsive to the indication that the first term spelling is correct.

12. The method of claim 8, wherein the second audio information conveys a maximum of five utterances of the first term.

13. The method of claim 8, further comprising:
determining whether the audio information is recognizable; and
upon determination that the audio information is unrecognizable, causing the diction interface to present an error message and subsequently prompt the first user to provide supplementary audio information, wherein the speech recognition is performed responsive to determination that the audio information is recognizable.

14. The method of claim 8, wherein first ground truth spelling is included in a maximum of five of the correlations.

* * * * *